July 31, 1956  R. K. CHAMBERLAIN ET AL  2,756,844
BRAKE HOUSING MOUNTING FOR SINGLE DISC BRAKE
Filed Sept. 23, 1952  2 Sheets-Sheet 1

INVENTOR.
RICHARD K. CHAMBERLAIN
BY FRANCESCO D. OLIVO

R. L. Miller
ATTORNEY

July 31, 1956  R. K. CHAMBERLAIN ET AL  2,756,844
BRAKE HOUSING MOUNTING FOR SINGLE DISC BRAKE
Filed Sept. 23, 1952  2 Sheets-Sheet 2

INVENTOR.
RICHARD K. CHAMBERLAIN
BY FRANCESCO D. OLIVO

*R. L. Miller*
ATTORNEY

United States Patent Office 2,756,844
Patented July 31, 1956

2,756,844

BRAKE HOUSING MOUNTING FOR SINGLE DISC BRAKE

Richard K. Chamberlain and Francesco D. Olivo, Akron, Ohio, assignors, by mesne assignments, to The Goodyear Tire & Rubber Company, a corporation of Ohio Application September 23, 1952, Serial No. 311,036

3 Claims. (Cl. 188—72)

This invention relates generally to brakes, especially to a brake housing and the mounting thereof, which brake housing is designed for use with a single disc brake.

The general object of the invention is to provide a novel type of a brake housing for a single disc brake, which housing is adapted to be either floated with respect to a fixed position disc, or which may be fixedly positioned and have the brake disc float with relation to the brake housing.

Another object of the invention is to provide a novel brake housing that can be positioned so that it maintains lining to brake disc clearance as lining wear occurs.

Another object of the invention is to provide a brake housing and mounting therefor with the housing and mounting being of sturdy but inexpensive construction and being easy to assemble in a brake.

Another object of the invention is to provide a special brake housing which has pairs of ears extending from opposed portions thereof adapted to receive pin means therein used to secure the brake housing for floating action with relation to a fixed position brake disc.

The foregoing and other objects and advantages of the invention will be made more apparent as the specification proceeds.

Two currently preferred embodiments of the invention are disclosed in the accompanying drawings, wherein.

Figure 1:
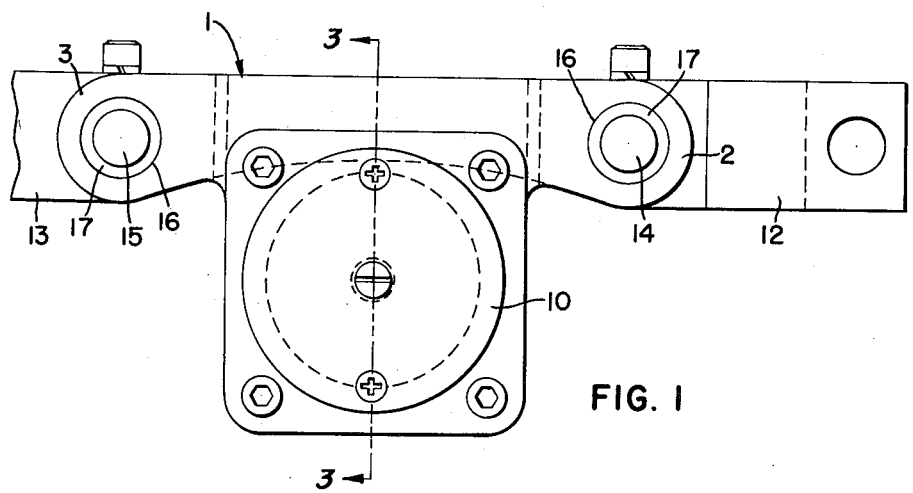
Fig. 1 is a side elevation of a brake housing and mounting embodying the principles of the invention.

The present invention relates to a brake construction wherein a brake housing that is of substantially C-shape in section is provided and it is adapted to fit over a peripheral portion of a brake disc, the housing being provided with pairs of parallel, spaced ears extending from each of a pair of opposed portions thereof. Brake means are carried by the brake housing and pin or bolt means engage at least one ear of each of the two pairs of ears on the brake housing to position it in a desired manner with relation to a brake disc.

With reference to the details of the construction shown in the drawings, a brake housing is shown which is indicated as a whole by the numeral 1. This brake housing is of substantially C-shape in section and includes a pair of spaced parallel ears 2, 2 that extend from one upper edge portion of the brake housing in parallel relation, while a similar pair of ears 3, 3 extend from an opposed portion of the brake housing 1 in a manner similar to the ears 2, 2. This brake housing 1 positions conventional brake means thereon that are shown as including a brake lining block 4 fixedly secured to the brake housing 1 by a screw 5 whereas a similar brake lining block 6 is secured to a carrier block 7 by a screw 8. Conventional brake actuating means, including a control piston 9 and a pressure cup 10 are also suitably secured to or carried by the brake housing 1 so that a conventional source of hydraulic fluid pressure may be connected to an enclosure formed within the pressure cup 10 to actuate the control piston 9.

It will be realized that a brake disc 11 is received between the brake lining blocks 4 and 6 so that a braking action can be exerted thereon at desired times. The brake disc 11 is fixedly secured by suitable means (not shown) in a fixed position on a rotary member (not shown) so it is necessary that the brake housing 1 and means associated therewith can float or move axially with relation to the brake disc 11 to compensate for wear of the brake lining blocks.

Figure 2:
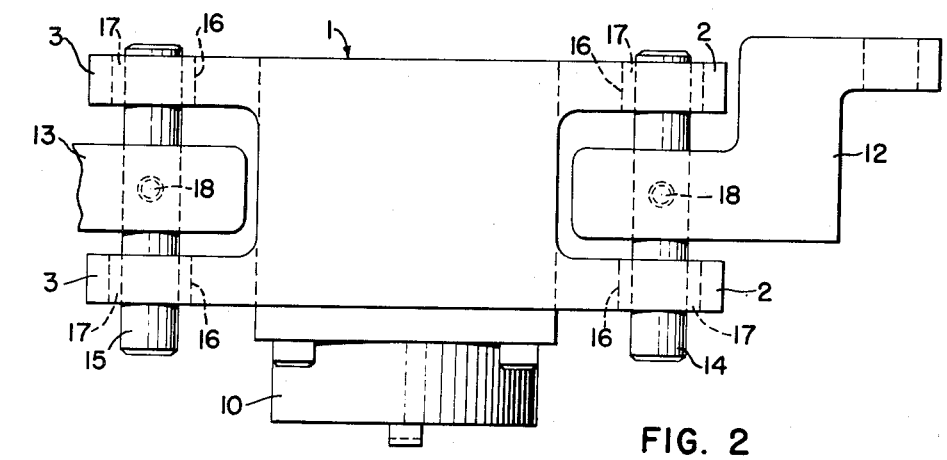
Fig. 2 is a plan of the apparatus shown in Fig. 1.
Figure 3:
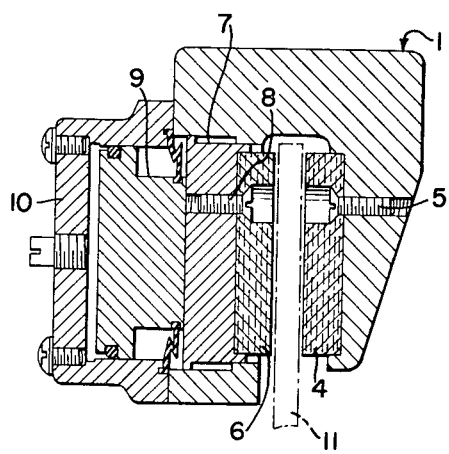
Fig. 3 is a vertical section taken on the line 3—3 of Fig. 1.

In order to position the brake housing 1 in a floating or adjustable manner, suitable brake support means, such as brackets 12 and 13, are secured to the means on which the brake housing is to be mounted, with one bracket extending in between each of the pair of ears 2, 2 and 3, 3, respectively, as shown in Fig. 2. Normally these brackets 12 and 13 are positioned in spaced relation to the ears thereadjacent and suitable positioning members, such as steel pins 14 and 15 extend between the ears 2, 2 and 3, 3, respectively, and through aligned holes 16 provided in the brackets 12 and 13. Suitable bushings 17 are positioned in the holes 16 to engage the pins 14 and 15 which are positioned in parallel relation. Set screws 18 may be used to aid in securing the pins 14 and 15 to the brackets to form a unit therefrom on which the brake housing may move or slide as brake lining wear occurs.

Figure 4:
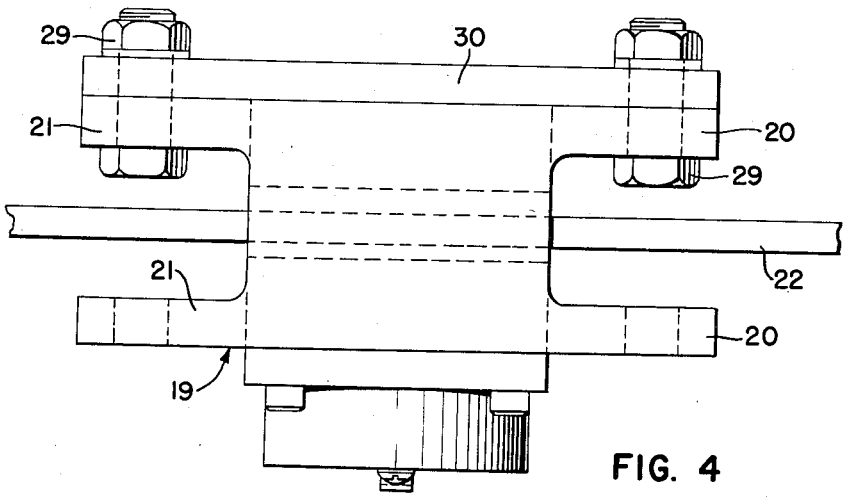
Fig. 4 is a plan, similar to Fig. 2, of a modified embodiment of the invention.
Figure 5:
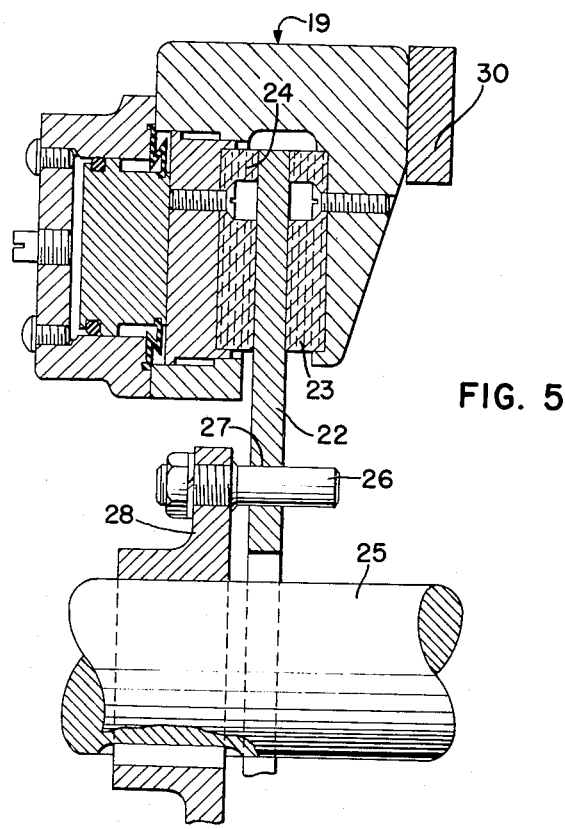
Fig. 5 is a vertical section through the brake housing and mounting of Fig. 4.

In the modified embodiment of the invention shown in Figs. 4 and 5, a brake housing 19, similar to the brake housing 1, is shown and it has pairs of ears 20, 20 and 21, 21 extending therefrom with similar brake means being carried by the brake housing 19 like the brake means on the brake housing 1. In this instance, a brake disc 22 is received intermediate brake lining means 23 and 24 operatively carried by the brake housing 19. This brake disc in this instance is free to float or move axially with relation to an axle 25 on which the brake disc is mounted by means of a plurality of circumferentially spaced, parallel pins or similar members 26 that individually engage bores 27 provided in radially inner portions of the brake disc 22. These pins 26 are suitably secured to a ring flange 28 that is secured to and rotates with the axle 25.

Since the brake housing 19 is associated with a movable or floating brake disc 22, it is possible to secure the brake housing 19 in a fixed position so that bolts 29 are shown as engaging one ear of each of the pair of ears 20, 20, and 21, 21 to secure such brake housing 19 to a support flange 30 with which the bolts 27 are engaged. This support flange 30 is conventionally secured to any stationary member provided in the mechanism with which the brake housing 19 and axle 25 are associated.

It will be seen that the brake housings of the invention thus are of exactly the same construction regardless of whether the brake housing itself floats with relation to the remainder of the assembly or whether the brake housing is fixedly positioned and is used with a floating type of a brake disc. The brake housing and mounting means provided therefor are of relatively solid but inexpensive construction and are adapted to give an effective service life. No modification is required of the brake housing to adapt it for use in different types of brake constructions and an effective braking action can be secured by use of the brake housing and mounting disclosed. Thus it is submitted that the objects of the invention have been achieved.

While certain representative embodiments and details have been shown for the purpose of illustrating the invention, it will be apparent to those skilled in this art that various changes and modifications may be made therein without departing from the spirit or scope of the invention.

Having thus described our invention, what we claim is:

1. In a brake, a brake housing that is of substantially C-shape in section and adapted to fit over a part of the periphery and sides of a brake disc, said housing having integral pairs of axially spaced ears extending from spaced portions thereof at each of a pair of opposed upper edges thereof, a brake lining block fixedly secured to said brake housing for engaging one face of a brake disc, a brake lining block movably carried by said brake housing in opposed relation to said first named brake lining block for engaging the opposed face of a brake disc, means for actuating said movable brake lining block to urge it towards said first-named brake lining block, brake support means extending between each of said pairs of ears on said brake housing in spaced relation to said ears, and a pin means individually and slidably engaging each of said pairs of said ears and being secured to said brake support means to float said brake housing in the brake at a plurality of axially and circumferentially spaced places for movement axially of a brake disc with which it is associated.

2. In a brake, a brake housing that is of substantially C-shape in section and adapted to fit over a portion of a brake disc, said housing having pairs of axially spaced ears extending from each of a pair of opposed surfaces thereof, a brake lining block on said brake housing, a brake lining block movably carried by said brake housing in opposed relation to said first named brake lining block, said brake housing being adapted to position said brake lining blocks on opposite sides of a brake disc, means for applying pressure to said movable brake lining block to urge it towards said first-named brake lining block, fixed position brake support means protruding between each of said pairs of ears on said brake housing, and means individually and slidably engaging each pair of said ears and being secured to the said brake support means protruding therebetween to float said brake housing in the brake at a plurality of axially and circumferentially spaced points for movement axially of a brake disc with which it is associated.

3. In a brake, a brake housing that is of substantially C-shape in section and adapted to fit over a part of the periphery and sides of a brake disc, said housing having two pairs of axially spaced ears extending from spaced portions thereof at opposed portions thereof, brake means for applying braking pressure to a brake disc associated with said brake housing, brake support means extending between and spaced from said ears on said brake housing, and pin means individually and slidably engaging each of said pairs of said ears and secured to said brake support means to float said brake housing in the brake at a plurality of spaced points for movement axially of a brake disc with which it is associated.

References Cited in the file of this patent

UNITED STATES PATENTS

| | | |
|---|---|---|
| 2,351,041 | Hawley | June 13, 1944 |
| 2,531,341 | Meador | Nov. 21, 1950 |
| 2,541,032 | Butler | Feb. 13, 1951 |
| 2,614,662 | Hawley | Oct. 21, 1952 |